(12) United States Patent
Bondesen et al.

(10) Patent No.: US 9,569,780 B2
(45) Date of Patent: *Feb. 14, 2017

(54) TOKENIZATION OF USER ACCOUNTS FOR DIRECT PAYMENT AUTHORIZATION CHANNEL

(71) Applicant: Bank of America Corporation, Charlotte, NC (US)

(72) Inventors: Laura Corinne Bondesen, Charlotte, NC (US); Scott Lee Harkey, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/170,681

(22) Filed: Jun. 1, 2016

(65) Prior Publication Data

US 2016/0275512 A1 Sep. 22, 2016

Related U.S. Application Data

(63) Continuation of application No. 14/280,271, filed on May 16, 2014, now Pat. No. 9,424,574.

(51) Int. Cl.
*G06Q 40/00* (2012.01)
*G06Q 20/40* (2012.01)
*G06Q 20/38* (2012.01)
*G06Q 20/36* (2012.01)

(52) U.S. Cl.
CPC ........ *G06Q 20/405* (2013.01); *G06Q 20/3674* (2013.01); *G06Q 20/38* (2013.01); *G06Q 20/385* (2013.01); *G06Q 20/3821* (2013.01); *G06Q 20/40* (2013.01); *G06Q 20/409* (2013.01)

(58) Field of Classification Search
None
See application file for complete search history.

(56) References Cited

U.S. PATENT DOCUMENTS

| | | | |
|---|---|---|---|
| 5,321,243 | A | 6/1994 | Groves et al. |
| 6,675,153 | B1 | 1/2004 | Cook et al. |
| 8,341,086 | B2 | 12/2012 | Goodrich et al. |
| 8,380,177 | B2 | 2/2013 | Laracey |
| 8,620,790 | B2 | 12/2013 | Priebatsch |
| 2010/0070754 | A1 | 3/2010 | Leach |

(Continued)

*Primary Examiner* — Thien M Le
*Assistant Examiner* — Asifa Habib
(74) *Attorney, Agent, or Firm* — Michael A. Springs; Moore & Van Allen PLLC; Peter B. Stewart

(57) ABSTRACT

Embodiments of the present invention disclose a financial institution system maintained by a financial institution and for tokenization of user accounts for using a direct payment authorization channel, whereby a third party payment authorization network is avoided. Embodiments establish a direct channel of communication between the system and a merchant or a merchant network in communication with the merchant; wherein the direct channel of communication comprises a network communication channel without a third party payment authorization system; receive a token issued by the financial institution and associated with a user account associated with a customer of the financial institution; receive transaction data comprising an amount associated with a transaction between the customer of the financial institution and the merchant; and determine whether to authorize the transaction based on the received token and the received transaction data.

12 Claims, 7 Drawing Sheets

(56) References Cited

U.S. PATENT DOCUMENTS

| | | |
|---|---|---|
| 2010/0078471 A1 | 4/2010 | Lin et al. |
| 2010/0262542 A1 | 10/2010 | Kranzley |
| 2011/0145152 A1 | 6/2011 | McCown |
| 2011/0320347 A1 | 12/2011 | Tumminaro et al. |
| 2013/0018793 A1 | 1/2013 | Wong et al. |
| 2013/0031006 A1 | 1/2013 | McCullagh et al. |
| 2013/0117185 A1 | 5/2013 | Collison et al. |
| 2013/0198080 A1 | 8/2013 | Anderson et al. |
| 2013/0204793 A1 | 8/2013 | Kerridge et al. |
| 2013/0246203 A1 | 9/2013 | Laracey |
| 2014/0032419 A1 | 1/2014 | Anderson et al. |
| 2014/0040144 A1 | 2/2014 | Plomske et al. |
| 2014/0136419 A1 | 5/2014 | Kiyohara |

TOKENIZATION OF USER ACCOUNTS FOR DIRECT PAYMENT AUTHORIZATION CHANNEL

CROSS-REFERENCE TO RELATED APPLICATION

This application is a continuation of U.S. patent application Ser. No. 14/280,271, filed May 16, 2014, which is hereby incorporated by reference in its entirety.

FIELD

This invention relates generally to the field of improving security for transactions, and more particularly embodiments of the invention relate to using tokens in place of account information in various ways in order to enter into transactions securely.

BACKGROUND

Entering into transactions using account information leaves an account holder open to potential account misappropriation because the customer's account information is shared between multiple parties (e.g., another user, a merchant, an acquiring financial institution, payment association networks, issuing financial institution, or the like) in order to complete the transaction.

BRIEF SUMMARY

Embodiments of the present invention address the above needs and/or achieve other advantages by providing apparatuses (e.g., a system, computer program product, and/or other device) and methods that help users enter into transaction securely.

Embodiments of the present invention disclose utilizing a token (e.g., a virtual payment instrument) associated with a payment device (e.g., a personal computer, a laptop, a mobile device, such as a phone, smartphone, tablet, or personal display device, fob, payment wand, or any other like device). The token may be associated in some embodiments directly with the payment device; however, in other embodiments the token may be associated with a digital wallet stored within the payment device.

Limits may be placed on the token associated with the account or on users associated with the token (or account). As such, there may be global limits on the accounts, users, or tokens, as well as individual limits on each of the plurality of users. The limits, which are described in further detail below, may relate to the amount spent using the account, the transaction amount, geographic limits, merchant or product limits, time limits, or the like. The limits may be approval limits or denial limits. Moreover, the limits may include being able to lock, unlock, suspend, or take another like action on the use of the token. The limits may be placed by an employer to control purchases made by employees, by a family member to control purchases made by other family members or dependents, or by any other primary account holder (e.g., trustee) on users of the account (e.g., trust recipient).

The business client or the retail client may be the account owner that determines, what users to associate with the token, the contribution amounts for funding the account, the limits to place on the token, or the like. In other embodiments an administrator (e.g., person in charge of the account) that is assigned to the account may determine the one or more users to associate with the token, the contribution amounts for funding the account, the limits to place on the token, or the like. Administrators may be employees or officers of a business (e.g., an accounting department) that are in charge of corporate accounts, and the users may be the employees of the company that have access to one or more accounts of the corporation. In another example, the administrators may be parents and the users may be the children, grandparents, or other dependents of the parents. In a further embodiment the administrators may be trustees and the users may be the beneficiaries of the trust controlled by the trustees. In still another embodiment, the administrators may be one of the users that has sent up an account for one or more transactions or groups of transactions (e.g., a trip, a product that a group of users are purchasing together, or the like), and the users may be people using the account for the transactions (e.g., going on the trip, responsible for a portion of the one or more transactions, or the like).

The token may be utilized instead of using the actual account information (e.g., account number or other account information) of the account with which the token is associated. As such, users do not utilize the actual account number or other account information to enter into a transaction and instead utilize the tokens to enter into transactions. Moreover, if the token becomes compromised, instead of having to reissue a new account number, the client or administrator may only need to replace the token while the customer account information stays the same.

Embodiments of the invention comprise systems, computer program products and methods for tokenization of user accounts for using a direct payment authorization channel. In accordance with embodiments of the invention, a financial institution system maintained by a financial institution and for tokenization of user accounts for using a direct payment authorization channel, whereby a third party payment authorization network is avoided. The system includes a memory device; and a processing device operatively coupled to the memory device, where the processing device is configured to execute computer-readable program code for establishing a direct channel of communication between the system and a merchant or a merchant network in communication with the merchant; wherein the direct channel of communication comprises a network communication channel without a third party payment authorization system; receiving a token issued by the financial institution and associated with a user account associated with a customer of the financial institution; receiving transaction data comprising an amount associated with a transaction between the customer of the financial institution and the merchant; and determining whether to authorize the transaction based on the received token and the received transaction data.

In some embodiments, the computer-readable program code is further configured to cause the processing device to receive one or more preferences from the customer for managing one or more limits on the use of the token associated with the user account. In some such embodiments, the computer-readable program code is further configured to cause the processing device to determine whether the received transaction data conforms to the one or more limits managed by the one or more preferences; if so, approve the transaction; and if not, decline the transaction.

In some embodiments, the computer-readable program code is further configured to cause the processing device to based on the received transaction data and the received token, approve the transaction.

In some embodiments, the computer-readable program code is further configured to cause the processing device to, in response to approving the transaction, initiate communication of an approval communication to the merchant over the direct communication channel and configured to indicate to the merchant that the transaction was approved.

In some embodiments, the computer-readable program code is further configured to cause the processing device to based on the received transaction data and the received token, decline the transaction. In some such embodiments, the computer-readable program code is further configured to cause the processing device to, in response to declining the transaction, initiate communication of a decline communication to the merchant over the direct communication channel and configured to indicate to the merchant that the transaction was declined.

In some embodiments, the computer-readable program code is further configured to cause the processing device to create the token and associate the token with the user account; associate the token with one or more pre-approved merchants; and store pre-approved merchant data indicating the association between the token and the one or more pre-approved merchants. In some such embodiments, the computer-readable program code is further configured to cause the processing device to determine whether the transaction data corresponds to one of the pre-approved merchants; if not, declining the transaction; and if so, determining whether to approve the transaction based at least in part on the transaction data and the token According to embodiments of the invention, a computer program product for use in a token based financial transaction system, whereby a shared token associated with a financial account is utilized by a collaborative group of users, comprising a plurality of users, to enter into transactions. The computer program product includes at least one non-transitory computer-readable medium having computer-readable program code portions embodied therein, where the computer-readable program code portions include an executable portion configured for establishing a direct channel of communication between the system and a merchant or a merchant network in communication with the merchant; where the direct channel of communication comprises a network communication channel without a third party payment authorization system. The computer-readable program code portions also include an executable portion configured for receiving a token issued by the financial institution and associated with a user account associated with a customer of the financial institution; an executable portion configured for receiving transaction data comprising an amount associated with a transaction between the customer of the financial institution and the merchant; and an executable portion configured for determining whether to authorize the transaction based on the received token and the received transaction data.

In some embodiments, the computer-readable program code portions further comprise an executable portion configured for receiving one or more preferences from the customer for managing one or more limits on the use of the token associated with the user account.

In some embodiments, the computer-readable program code portions further comprise an executable portion configured for determining whether the received transaction data conforms to the one or more limits managed by the one or more preferences; if so, approve the transaction; and if not, decline the transaction.

In some embodiments, the computer-readable program code portions further comprise an executable portion configured for, based on the received transaction data and the received token, approving the transaction.

In some embodiments, the computer-readable program code portions further comprise an executable portion configured for, in response to approving the transaction, initiating communication of an approval communication to the merchant over the direct communication channel and configured to indicate to the merchant that the transaction was approved.

In some embodiments, the computer-readable program code portions further comprise an executable portion configured for, based on the received transaction data and the received token, declining the transaction.

In some embodiments, the computer-readable program code portions further comprise an executable portion configured for, in response to declining the transaction, initiating communication of a decline communication to the merchant over the direct communication channel and configured to indicate to the merchant that the transaction was declined.

In some embodiments, the computer-readable program code portions further comprise an executable portion configured for creating the token and associating the token with the user account; an executable portion configured for associating the token with one or more pre-approved merchants; and an executable portion configured for storing pre-approved merchant data indicating the association between the token and the one or more pre-approved merchants.

According to embodiments of the invention, a method for tokenization of user accounts for using a direct payment authorization channel, whereby a third party payment authorization network is avoided, includes establishing, by a processor of a financial institution system, a direct channel of communication between the system and a merchant or a merchant network in communication with the merchant; wherein the direct channel of communication comprises a network communication channel without a third party payment authorization system; receiving, by the processor, a token issued by the financial institution and associated with a user account associated with a customer of the financial institution; receiving, by the processor, transaction data comprising an amount associated with a transaction between the customer of the financial institution and the merchant; and determining, by the processor, whether to authorize the transaction based on the received token and the received transaction data.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
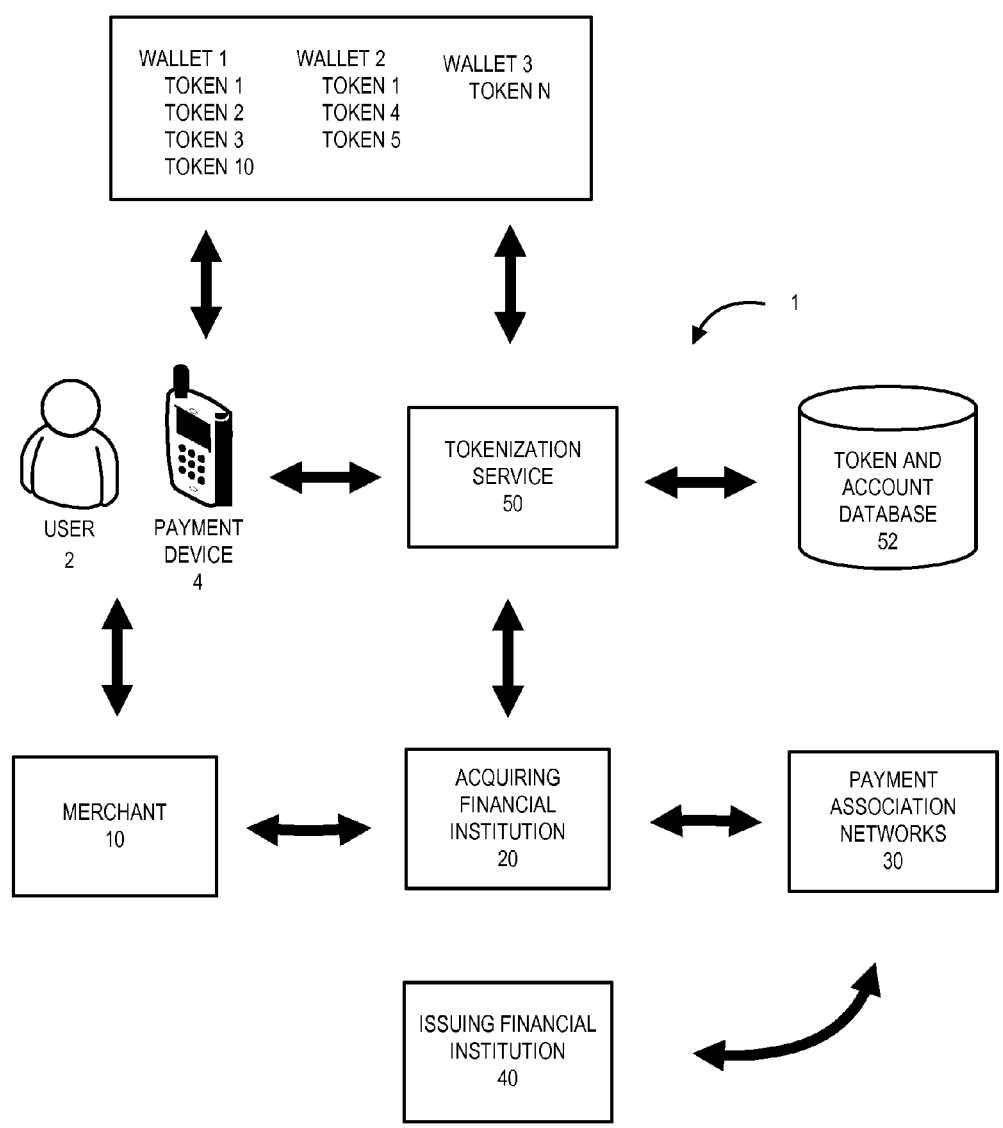
Figure 2:
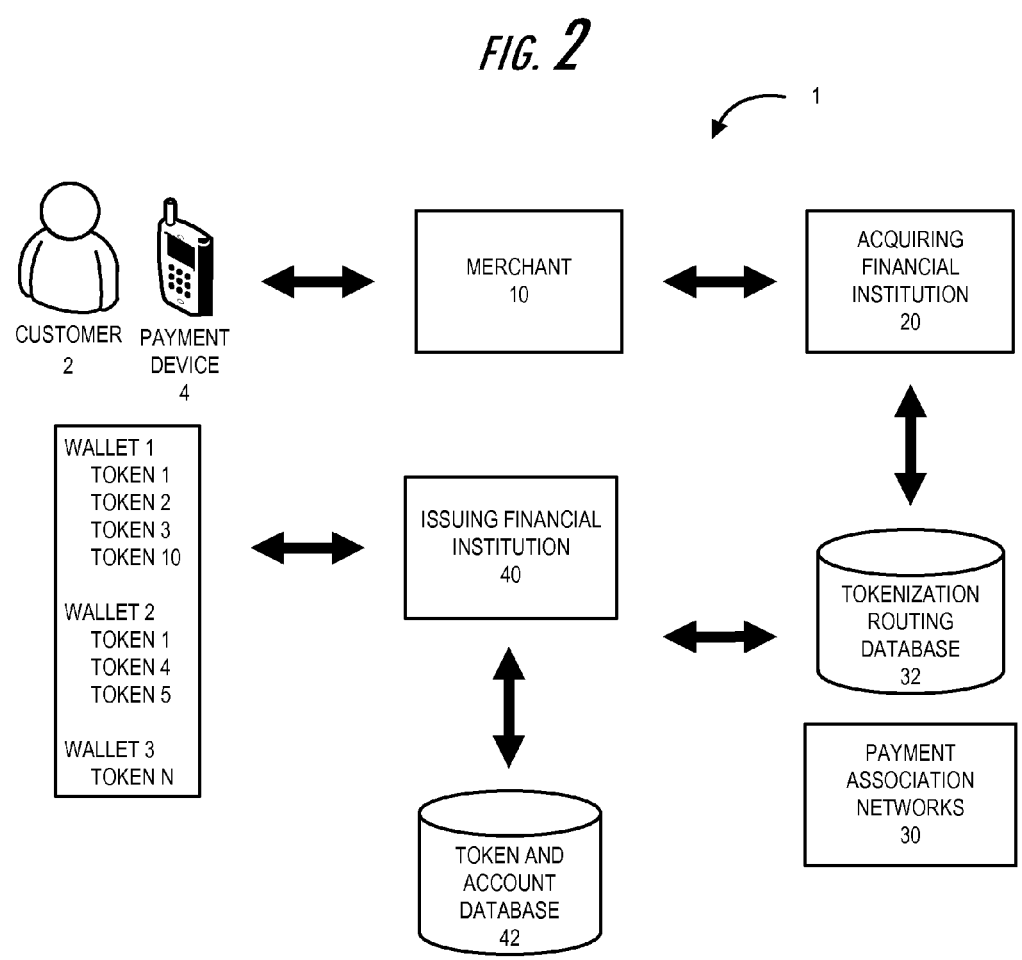
Figure 3:
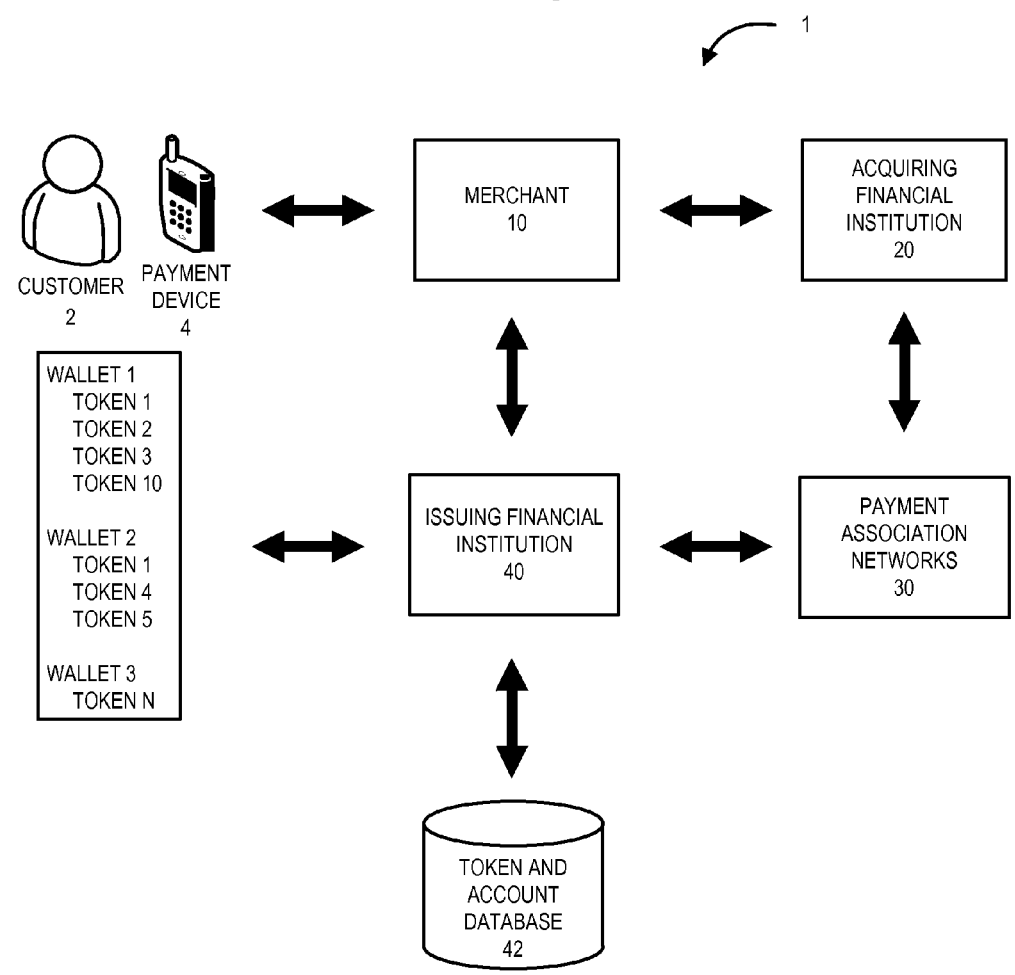
Figure 4:
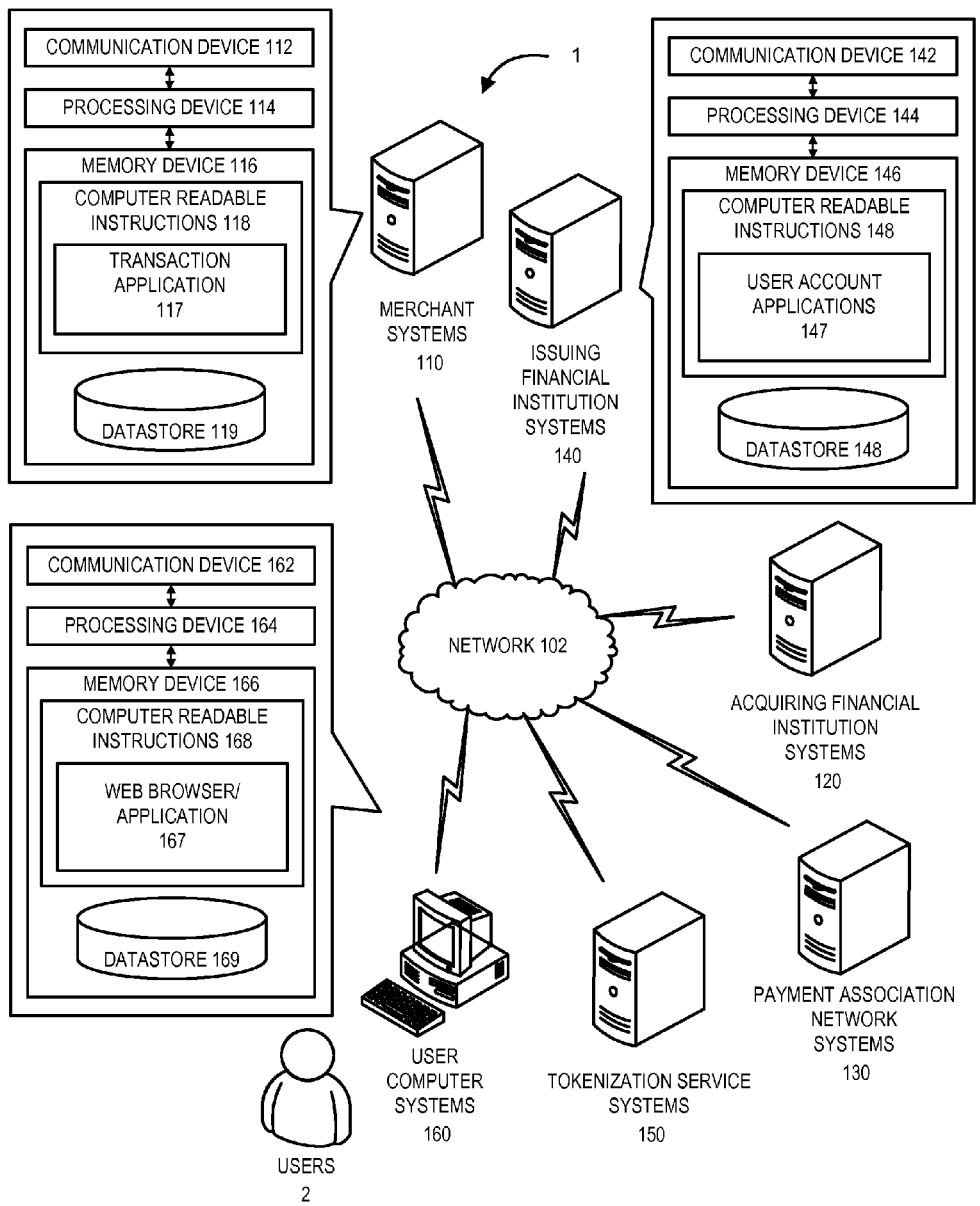
Figure 5:
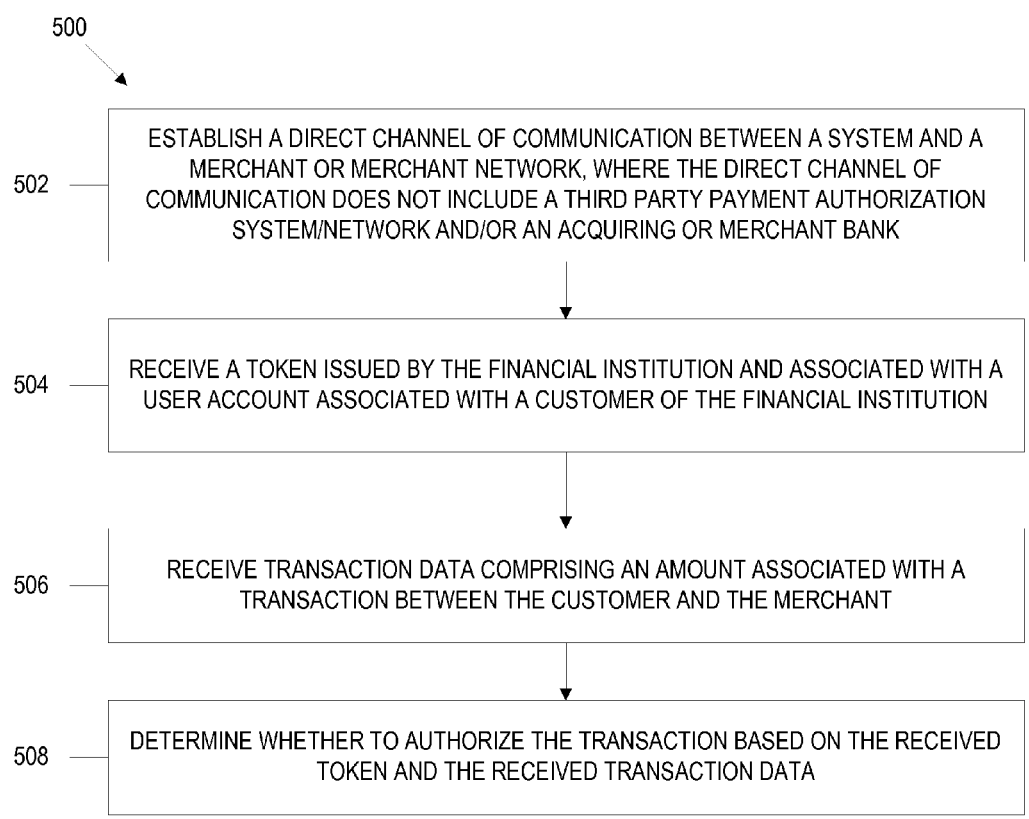
Figure 6:
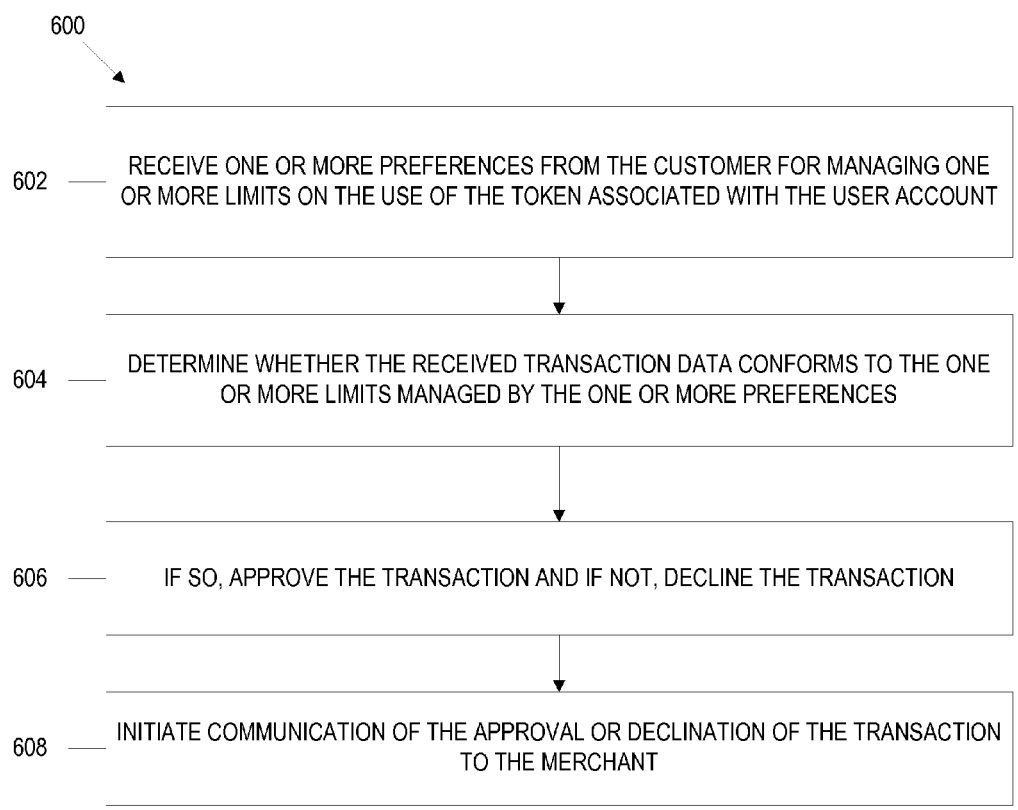
Figure 7:
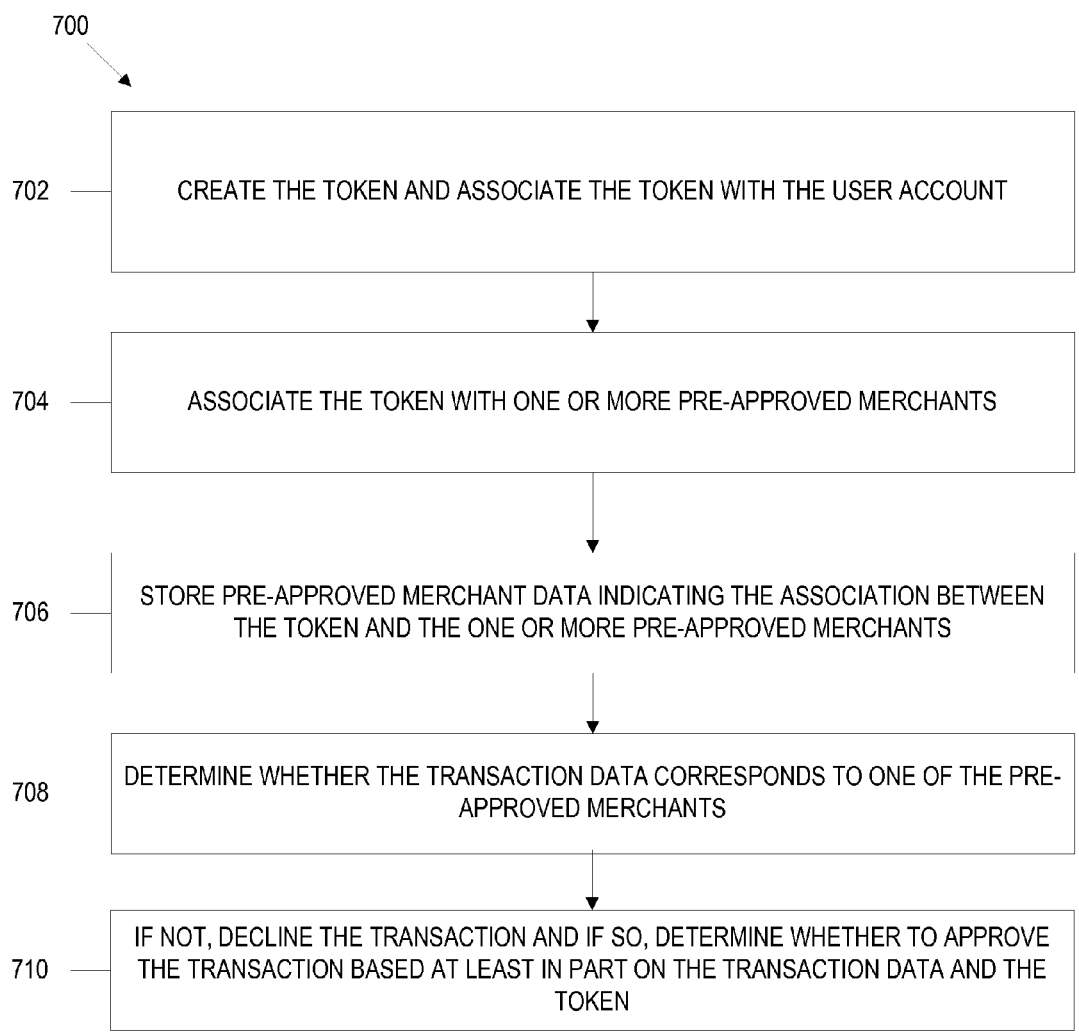

Having thus described embodiments of the invention in general terms, reference will now be made to the accompanying drawings, wherein:

FIG. 1 illustrates a high level process flow for a entering into a transaction using a token, in accordance with one embodiment of the present invention;

FIG. 2 illustrates a high level process flow for a entering into a transaction using a token, in accordance with one embodiment of the present invention;

FIG. 3 illustrates a high level process flow for a entering into a transaction using a token, in accordance with one embodiment of the present invention;

FIG. 4 illustrates a block diagram for a tokenization system environment, in accordance with one embodiment of the present invention;

FIG. 5 is a flowchart illustrating a method for tokenization of user accounts for using a direct payment authorization channel, in accordance with one embodiment of the present invention;

FIG. 6 is a flowchart illustrating a method for tokenization of user accounts for using a direct payment authorization channel, in accordance with one embodiment of the present invention; and FIG. 7 is a flowchart illustrating a method for tokenization of user accounts for using a direct payment authorization channel, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution" or "bank," one of ordinary skill in the art will appreciate that other embodiments of the invention may involve other businesses or institutions that take the place of or work in conjunction with the financial institution or bank to perform one or more of the processes or steps described herein as being performed by a financial institution or bank. Still in other embodiments of the invention the financial institution or bank described herein may be replaced with other types of businesses or institutions that offer services to users.

The present invention relates to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

FIGS. 1 through 3 illustrate a number of different ways that the user 2 may use one or more tokens in order to enter into a transaction, as well as how the parties associated with the transaction may process the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 2 may enter. The limits may be placed on the token by the user 2, or another entity (e.g., client, administrator, person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

Instead of the process described above, in which the acquiring financial institution 20 requests the token from the tokenization service 50, in some embodiments the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly, or indirectly through the payment association networks 30.

The embodiment illustrated in FIG. 1 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 2 illustrates another embodiment of a token system process 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., through a wallet created for a business client or retail client associated with the user 2) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 1. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 itself (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments no customer account information would be stored in this tokenization routing database 32, only the instructions for routing particular tokens may be stored.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

FIG. 3 illustrates another embodiment of the token system process 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system process 1 in FIG. 2, the token system process 1 in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein may be utilized in order to process transactions between a user 2 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 50 may also receive additional transaction information from the user 2 through the digital wallet using the application program interfaces (APIs) or other applications created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 1 or in other token system processes not specifically described in FIGS. 1 through 3.

In various implementations of token-based transaction systems, limits may be implemented as discussed below. The limits may include limiting a transaction by a predetermined number of merchants 10 (e.g., a finite number of allowable/deniable merchants 10), a particular group of merchants 10 or one or more merchant categories, (e.g., only grocers), a product type, a group of products or product categories (e.g., only food or gasoline purchases), an amount limit associated with the transaction (e.g., no transaction amounts above a predetermined threshold are allowed, or a minimum transaction amount), a history of purchases, user behavior, a frequency of purchases, a geographic location (e.g., no transactions allowed outside of a predetermined range, specific merchant, area, zip code, city, county, state, country, radius from a specified point, route along one or more roads), a period of time (a time, a day, a month, a year, a quarter) or the like. One or more limits may be assigned singularly or in combination with other limits to either one or more users 2, the token, a device or application associated with a user 2 or a token, an account, a digital wallet, or the like. The present invention may further be configured to determine a time zone that the user, a device associated with the user, or a transaction is in currently. The limits may be defined or configured by the user 2, by an administrator, by an agent associated with the entity, by a third party, or the like based on need. Configuring the limits may require authentication (e.g., a password), device authentication, or another type of authentication. The entity instituting the limits may be enabled to assign the limits to the user 2, the token, or both, or a device, an account, a digital wallet, or the like.

For example, a child may be limited by a $10-a-day weekday spending budget that is suspended on the weekends. However, the weekend may impose different limits to the token associated with the child's account, as it may be limited to transactions with merchants who sell food, gasoline, wherein entertainment venues are restricted. These limits may be defined by the parent through the methods described herein.

In some embodiments, the one or more limits may be based on an IP (internet protocol) address associated with the IP gateway. Typically, an IP gateway is a node that allows communication between networks. An IP gateway, sometimes referred to as a router of internet access device (IAD), can be as simple as a computer that controls the dataflow between two networks. The one or more limits may be based on restricting data flow between the user's IP address and one or more specific IP addresses of one or more IP gateways associated with one or more merchants. For example, the apparatus may be configured to limit the use of a token to conduct an e-commerce transaction with a merchant based on an IP address of the IP gateway associated with the merchant's network. In one aspect, an e-commerce transaction may include a transmission of transaction information from the user's web browser to a merchant's IP webserver through the merchant's IP gateway. In response, the apparatus may be configured to detect the IP address of the IP gateway associated with the merchant and the IP address of the IP gateway associated with the customer conducting the transaction. Once the IP address is detected, the apparatus may determine if the IP address is in accordance with the one or more limits. In response to determining if the IP address is in accordance with the one or more limits, the apparatus may be configured to allow the transaction. On the other hand, if the IP address is not in accordance with the one or more limits, the apparatus may be configured to deny the transaction. The limits may also include limits on executing transactions with particular websites, for example through the URL addresses of the websites, merchants that sell products through the URL addresses, or the like.

In some embodiments, limitations may be placed on the individual users 2. Any transaction associated with the user 2 may be monitored or stored as transaction information by the present invention, which may then determine if the transaction is allowed or denied based on the predetermined limitations associated with the user 2. Associating limits on a user level allows for easy replacement of tokens when a token is misappropriated (e.g., when a token is lost) since the limits remain associated with the user 2 regardless of the token used. Limitations associated with the user 2 may also include an association with an account or a device (e.g., a smart phone, a tablet, or the like) known to be owned or operated by the user 2. Limits may further be associated with one user 2, multiple users, a group of users, or all users. The limitations may be statically or dynamically assigned to the user 2. For example, the user 2 may have a spending limit associated with an account on alternating weeks. One week the user 2 may have a spending limit, but the next week the limit may be removed or altered to include a geographic limit. One or more users 2 may be assigned to the same limits, or different limits.

In other embodiments, the limitations may be placed on the tokens. Any transaction associated with the token may be monitored or stored as described by the present invention herein, which may then determine if the transaction is allowed or denied based on the limitations associated with the token. Additionally, by associating the limitations with the token instead of the user 2, the system may more simply replace a first token with one or more limits with a second token with one or more different limits instead of having to log into an account to change the limits associated with account or the user 2 on an as-needed basis. In other embodiments of the invention the token may remain the same and the limits on the token may change. The limitations may be statically or dynamically assigned to the token. Limitations associated with the token may also include an association with an account or a device (e.g., a smart phone, a tablet, or the like) known to have access to an account associated with the token.

In another example, two users may both have access to a joint account (e.g., a pre-funded business account) that has a maximum spending limit of $1,000 for a week-long business trip to City 1. The token associated with the joint account, may include limits that authorize transaction requests that are initiated within a 25-mile radius of City 1, or at predetermined travel stops (e.g., airports, bus stops, gas stations, restaurants, hotels, or the like) in route to City 1 for the week of the trip. In some embodiments, the two users may be issued the same token associated with the same account. If one of the two users loses his token (or the security of his token is otherwise misappropriated) then a new replacement token may be issued to one or both of the users. Preexisting limits associated with the token may be required to be reinstated on the newly issued tokens. Alternatively, the preexisting limits may also be automatically transferred to the newly issued replacement token. In other embodiments, the two users may each be issued an individual token associated with the same joint account. If one of the two users loses his token (or the security of his token is otherwise compromised) then a new token may be issued to only one of the users, namely the user who lost his token. Preexisting limits associated with the token may be required to be reinstated on the newly replacement issued token, or may be automatically transferred to the newly issued replacement token.

In continuing with the same example as above, if the limits are placed on the account (e.g., global limits) and the users 2 (e.g., individual user 2 level) then when the tokens are replaced there is no needed to worry about changing the limits on the token or reinstituting the limit because the limits are not associated with the token. However, if there are a large number of users (e.g., 10, 20, 50, 100, 500, 1000, or the like) it may be difficult to continuously monitor the transaction limits of each of the users 2 and change the limits as the needs of each individual user 2 changes. Instead, it may be more efficient to control the limits based on a token level as explained below.

When the limits are associated with a token it may be easier to edit the limits of current tokens by simply pushing (or allowing a user to pull) new tokens into the account whenever the limits change. For example, if the user's 2 configured limits (e.g., a spending limit at entertainment-related merchants) are to be modified for a period of time (e.g., no transactions after 6 pm), the present invention may issue a new token that prevents transactions after 6 pm. In some embodiments, when the token expires the limits on the account are removed. Therefore, the present invention may not be required to constantly update limit configurations, but rather simply issue a new token to the user (or alternatively remove a token from the user). As such, the token may be associated with a specific account, and may further be associated with specific limits. For example, if the user 2 is on a business trip and needs to take a customer on a last minute dinner, the employer (e.g., administrator) may issue the user a new token that can be used for a specific restaurant at a specific time in order to allow a transaction that might not have been previously allowed. In this way the token is provided to the user 2 and it may disappear after the time period is extinguished and/or the transaction is completed. Therefore, the user 2 or multiple users 2 may have real-time access to a larger pool of funds (e.g., a business count) based on access to a token, as well as limits associated with the token or the user 2. If the limits were based on the user 2 the administrator or other entity may have to first modify the limits associated with the user 2 to allow the transaction and thereafter change the limits associated with the user 2 again after the transaction occurs. Thus, the token may serve as a temporary access point to an account. In another example, in a collective group of users 2 instead of allowing all of the users 2 within the collaborative group of users 2 the same access to the account, the administrator or other entity may provide each user 2 multiple tokens (e.g., single use or multi-use tokens) that may be used for specific types of transactions with specific limits. If the limits need to change for the one or more users 2, some of the tokens may be removed and additional tokens may be provided to the users 2 with new limits as opposed to manually configuring the limits associated with each of the users 2. For example, one user in the collaborative group may receive five (5) $20 tokens that can be used specifically at various merchants 10. As the funds are used for each of the tokens the tokens may disappear. Alternatively, another user in the collaborative group of users 10 may receive $100 tokens that can be used to enter into transactions for the hotel rooms of the collaborative group of users 10.

A combination of utilizing limitations on both a global user and/or token scale (e.g., a total spending limit for token associated with a joint account) and an individual user and/or individual token scale (e.g., individual spending limits for each individual user 2 or individual tokens) may provide secure control and regulation of spending with flexibility in limiting transactions in a number of different ways. As an example, limitations can be placed on the user 2 in conjunction with limitations associated with a shared token associated with the joint account. For example, the shared token may have a $1,000 limit, which is further broken down on a user level such that one user may have a spending limit of $700 out of the total $1,000, while the other user may have spending limit of $300 out of the total $1,000. These limitations may help enable the joint account holder (e.g., a corporate account) to effectively manage the overall spending budget while also controlling the spending budgets of each user 2.

The present invention may include means for defining, selecting, modifying, adding, or deleting limitations associated with the user, the token, or the account, as well as for grouping users 2 together. The priority or precedence order of how limitations are applied (e.g., limiting the user 2 before the token, limiting the token before the user, or limiting both the user and the token concurrently) may be configured as well. Limitations may be controlled by a user 2 or by someone else (e.g., a merchant, the issuing financial institution, a representative associated with an entity, a third party, a tokenization service, or the like). The limitations may be effective for a predetermined period of time or independently of time.

While the system has been described as determining whether the transaction meets the limits and either allowing or denying a transaction based on that determination, in some embodiments the limits (also described herein as filters), may also be responsive to transaction information. For example, exceptions to the filters may allow a transaction even if the filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example, the system may determine that a transaction does not meet a category limit because doing so would cause the token to exceed the category limit for the time period. In this example, however, the system also determines that the token is near, e.g., within one week, within three days, within one day, or the like, the expiration date of the token or the current evaluation period for the token and that the token has remaining funds in a different category. Given the short period of time remaining for the expenses to be made, the system may determine that the transaction falls within an exception and allow the transaction. In another example, the system may determine that the user is outside of geographic limits defined by a route. The system, however, determines that the user has conducted a transaction at the merchant frequently in the past and therefore allows the transaction based on the previous number of transactions at the merchant. These examples use multiple types of transaction information, e.g., the date of the transaction, the location of the transaction, the category of the transaction, the amount of the transaction, and the like, to determine if the exceptions apply. In some embodiments, only a single piece of transaction information applies. For example, the system may always permit transactions that are associated with a specific category, for example, emergency expenses. The system may always permit transactions at emergency rooms, doctors' offices, and the like.

In some embodiments, the exceptions are determined by the system and/or the user. For example, the system may provide a list of exceptions based on the user's transaction history. If the user has a favorite coffee shop, the system may allow transactions at the coffee shop up to a certain amount even if the transaction would not meet a limit. The user or an administrator may provide exceptions based on location or other transaction information. For example, the user may input exceptions that allow transactions within a specific region, e.g., a city, that would not be allowed outside of the specific region. The exceptions may be changed at any time by the system or user or administrator.

The exceptions may be limited by frequency, amount, percentage of the limit, or the like. For example, a transaction may qualify for an exception but only up to a certain percentage of the funds remaining in a related category. For example, a transaction may qualify for an exception because the expense period for the token is almost expired and there are remaining funds in a first category. The system may permit a transaction in a second category up to some percentage (e.g., 50%) of the funds remaining in the first category.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

FIG. 4 illustrates a token system 100 environment, in accordance with an embodiment of the present invention. As illustrated in FIG. 4, the user computer systems 160 are operatively coupled, via a network 102 to the merchant systems 110, issuing financial institution systems 140, acquiring financial institution systems 120, payment association networks 130, and/or the tokenization service systems 150. In this way, the user 2 may utilize the user computer systems 160 to enter into secure transactions using a token with the merchant 10 through the use of the merchant systems 110, acquiring financial systems 120, payment association networks 130, the issuing financial institution systems 140, and/or the tokenization service systems 150. FIG. 4 illustrates only one example of embodiments of a token system 100, and it will be appreciated that in other embodiments one or more of the systems (e.g., computers, mobile devices, servers, or other like systems) may be combined into a single system or be made up of multiple systems.

The network 102 may be a global area network (GAN), such as the Internet, a wide area network (WAN), a local area network (LAN), or any other type of network or combination of networks. The network 102 may provide for wireline, wireless, or a combination of wireline and wireless communication between devices on the network.

As illustrated in FIG. 4, the user computer systems 160 generally comprise a communication device 162, a processing device 164, and a memory device 166. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 164 is operatively coupled to the communication device 162 and the memory device 166. The processing device 164 uses the communication device 162 to communicate with the network 102 and other devices on the network 102, such as, but not limited to, the merchant systems 110, issuing financial institution systems 140, acquiring financial institution systems 120, payment association network systems 130, and/or tokenization service systems 150. As such, the communication device 162 generally comprises a modem, server, or other device for communicating with other devices on the network 102, and a display, camera, keypad, mouse, keyboard, microphone, and/or speakers for communicating with one or more users 102. The user computer systems 160 may include, for example, a payment device 4, which may be a personal computer, a laptop, a mobile device (e.g., phone, smartphone, tablet, or personal display device ("PDA"), or the like) or other like devices whether or not the devices are mentioned within this specification. In some embodiments the use of the term payment device 4 described herein may be replaced by the term user computer system 160. In some embodiments, the user computer systems 160, such as a payment device 4, or other devices, could include a data capture device that is operatively coupled to the communication device, processing device 164, and the memory device 166. The data capture device could include devices such as, but not limited to a location determining device, such as a radio frequency identification ("RFID") device, a global positioning satellite ("GPS") device, Wi-Fi triangulation device, or the like, which can be used by a user 2, institution, or the like to capture information from a user 2, such as but not limited to the location of the user 2.

As further illustrated in FIG. 4, the user computer systems 160 comprises computer-readable instructions 168 stored in the memory device 166, which in one embodiment includes the computer-readable instructions 168 of a tokenization application 167 (e.g., a digital wallet or other application that utilizes tokens). In some embodiments, the memory device 166 includes a datastore 169 for storing data related to the user computer system 160, including but not limited to data created and/or used by tokenization application 167. As discussed above the tokenization application 167 allows the users 2 to enter into secure transactions using one or more tokens instead of customer account number or other customer information.

As further illustrated in FIG. 4, the merchant systems 110 generally comprise a communication device 112, a processing device 114, and a memory device 116. The processing device 114 is operatively coupled to the communication device 112 and the memory device 116. The processing device 114 uses the communication device 112 to communicate with the network 102, and other devices on the network 102, such as, but not limited to, the user computer systems 160, issuing financial institution systems 140, acquiring financial institution systems 120, payment association network systems 130, and/or the tokenization service systems 150. As such, the communication device 112 generally comprises a modem, server, or other device(s) for communicating with other devices on the network 102.

As illustrated in FIG. 4, the merchant systems 110 comprise computer-readable program instructions 118 stored in the memory device 116, which in one embodiment includes the computer-readable instructions 118 of a transaction application 117. In some embodiments, the memory device 116 includes a datastore 119 for storing data related to the merchant systems 110, including but not limited to data created and/or used by the transaction application 117. The transaction application 117 processes transactions with the user regardless of whether or not the user is using tokens or the actual account number or other account information.

As further illustrated in FIG. 4, the issuing financial institution systems 140 generally comprise a communication device 142, a processing device 144, and a memory device 146. The processing device 144 is operatively coupled to the communication device 142 and the memory device 146. The processing device 144 uses the communication device 142 to communicate with the network 102, and other devices on the network 102, such as, but not limited to, the user computer systems 160, merchant systems 110, acquiring financial institution systems 120, payment association network systems 130, and/or the tokenization service systems 150. As such, the communication device 142 generally comprises a modem, server, or other devices for communicating with other devices on the network 102.

As illustrated in FIG. 4, the issuing financial institution systems 140 comprise computer-readable program instructions 148 stored in the memory device 146, which in one embodiment includes the computer-readable instructions 148 of a user account application 147. In some embodiments, the memory device 146 includes a datastore 149 for storing data related to the issuing financial institution systems 140, including but not limited to data created and/or used by the user account application 147. The user account application 147 allows the issuing financial institution to store information regarding the user accounts. For example, in the embodiments in which the issuing financial institution 40 is responsible for managing the tokenization, the user account application 147 stores the tokens associated with the account number or the other customer information, which the users 2 utilize to enter into transactions. In other embodiments of the invention, the association of the tokens and accounts numbers and other account information from the issuing financial institution 40 may be stored by a third party.

The acquiring financial institution systems 120 are operatively coupled to the user computer systems 160, merchant systems 110, payment association network systems 130, issuing financial institutions 140, or tokenization service systems 150 through the network 102. The acquiring financial institution systems 120 have devices that are the same as or similar to the devices described for the user computer systems 160, merchant systems 110, or the issuing financial institution systems 140 (e.g., communication device, processing device, memory device with computer-readable instructions, datastore, or the like). Thus, the acquiring financial institution systems 120 communicate with the user computer systems 160, merchant systems 110, payment association network systems 130, issuing financial institution systems 140, and/or the tokenization service systems 150, in the same or similar way as previously described with respect to these systems above. The acquiring financial institution systems 120, in some embodiments, receives the tokens and/or other customer information, along with the transactions information for a transaction, from the merchants 10 and distributes this information to the proper tokenization service 50, payment association networks 30, or directly the issuing financial institution 40.

The payment association network systems 130 are operatively coupled to the user computer systems 160, merchant systems 110, acquiring financial institution systems 120, issuing financial institutions 140, or tokenization service systems 150 through the network 102. The payment association network systems 130 have devices that are the same as or similar to the devices described for the user computer systems 160, merchant systems 110, or the issuing financial institution systems 140 (e.g., communication device, processing device, memory device with computer-readable instructions, datastore, or the like). Thus, the payment association network systems 130 communicate with the user computer systems 160, merchant systems 110, acquiring financial institution systems 120, issuing financial institution systems 140, and/or the tokenization service systems 150, in the same or similar way as previously described with respect to these systems above. The payment association networks systems 130, in some embodiments, receive the tokens and/or other customer information, along with the transactions information for a transaction, from the merchants 10 or the acquiring financial institution 20, and distribute this information to the proper issuing financial institution 40.

The tokenization service systems 150 are operatively coupled to the user computer systems 160, merchant systems 110, acquiring financial institution systems 120, or issuing financial institutions 140 through the network 102. The tokenization service systems 150 have devices the same or similar to the devices described for the user computer systems 160, merchant systems 110, or the issuing financial institution systems 140 (e.g., communication device, processing device, memory device with computer-readable instructions, datastore, or the like). Thus, the tokenization service systems 150 communicate with the user computer systems 160, merchant systems 110, acquiring financial institution systems 120, and/or issuing financial institution systems 140, in the same or similar way as previously described with respect to the these systems above. The tokenization service systems 150, in some embodiments, create, associate, and store the tokens, account numbers, and/or other customer information in order to shield the account numbers or other customer account information from the merchants 10, and other parties as described throughout this specification. In some embodiments as illustrated in FIG. 1, the tokenization service systems 150 may be operated by a third party entity. In other embodiments the tokenization service systems 150 may be operated by the issuing financial institution 40 or entity associated with the issuing financial institution 40, such that only the issuing financial institution 40 has access to the actual account number or other account information.

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Generally speaking, when a transaction is processed using a bank card, an issuing bank must issue a payment device that is used during the transaction at a merchant location. The merchant's bank, typically referred to as an acquiring bank, then forwards the transaction data to a payment processing network, which processes the payment and sends the processed payment to the issuing bank and through the network to acquiring bank and/or the merchant. In order to fully settle a transaction, it may take two or more days. Thus, if a single financial institution (FI) could take on the multiple roles, such as the roles of acquiring bank, issuing bank and/or the payment processing network, the process of settling transactions may be improved. Tokenization of a user's accounts affords an issuing FI an opportunity to process transaction without the necessity of involving the payment processing network and in some cases the acquiring bank.

According to embodiments of the invention, a financial institution (FI) may issue a token (such as an alpha-numeric code) that is associated with a customer's bank account. The FI establishes its own payment authorization network that includes a direct channel or rail between a merchant (possibly through a merchant network) and the FI. This direct channel avoids third party payment authorization networks and/or acquiring or merchant banks from communication of the transaction data and for authorization of the transaction. Instead, the token and transaction data is processed by the FI and approved or declined. Thus, the merchant may communicate the token directly to the FI so that the FI may avoid third party network when processing transactions.

Referring now to FIG. 5, a flowchart illustrates a method for tokenization of user accounts for using a direct payment authorization channel (or rail), whereby a third party payment authorization network (and/or an acquiring or merchant bank) is avoided. The first step, represented by block 502, is to establish a direct channel of communication between a system (such as one or more servers maintained by the FI) or merchant network, where the direct channel of communication avoids a third party payment authorization system/network and/or an acquiring or merchant bank. The next step, represented by block 504, is to receive a token, which in some embodiments is issued by the FI and associated with a user account associated with a customer of the FI. The next step, represented by block 506, is to receive transaction data comprising an amount associated with a transaction between the customer and the merchant. The final step, represented by block 508, is to determine whether to authorize the transaction based on the received token and the received transaction data.

Referring now to FIG. 6, a flowchart illustrates a method for tokenization of user accounts for using a direct payment authorization channel (or rail), whereby a third party payment authorization network (and/or an acquiring or merchant bank) is avoided. FIG. 6 provides that limits may be placed on the use of the token. The first step, represented by block 602, is to receive one or more preferences from the customer for managing one or more limits (such as one or more of the limits discussed above) managed by the one or more preferences. The limits may include, for example, restrictions on the use of the token to one or more merchants, restriction on use of token up to a threshold spending limit and limits may tie the token to specific categories or goods/services or otherwise. The next step, represented by block 604, is to determine whether the received transaction data conforms to the one or more limits managed by the one or more preferences. The next step, in block 606, is that if the transaction data conforms to the limits, to approve the transaction, and if it does not, to decline the transaction. Finally, in block 608, the system initiates communication of the approval or declination of the transaction to the merchant.

Referring now to FIG. 7, a flowchart illustrates a method for tokenization of user accounts for using a direct payment authorization channel (or rail), whereby a third party payment authorization network (and/or an acquiring or merchant bank) is avoided. FIG. 7 provides that the financial institution may create the token and store pre-approved merchant data associated with the token. The first step, in block 702, is to create the token and associate the token with the user account. The next step, represented by block 704, is to associate the token with one or more pre-approved merchants. These merchants may be pre-approved based on the customer preferences, the FI preferences and/or both. The next step, in block 706, is to store pre-approved merchant data indicating the association between the token and the one or more pre-approved merchants. Next, in block 708, the system determines whether the transaction data corresponds to one of the pre-approved merchants. Finally, in block 710, if the transaction data does not correspond to a pre-approved merchant, the transaction is declined and if it does, the transaction processing may proceed such that approval/decline may be determined based at least in part on the transaction data and the token.

In some embodiments, the merchant may initiate a communication call to the FI during a digital transaction such as an online transaction or mobile device transaction. This call may allow the merchant to communicate its transaction data to the FI directly, that is, without sending it through an acquiring bank and/or a payment processing network.

In one embodiment, the token is formatted so that it can ride on the communication rail(s) that are pre-existing between various banks, such as acquiring banks, and the FI for processing the transaction. In such a case, the communication may use the pre-existing acquiring bank infrastructure.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A financial institution system maintained by a financial institution and for tokenization of user accounts so that none of a user's credit card number, debit card number and/or account number are necessary to perform a transaction with a merchant, thereby improving security of the user's credit card number, debit card number and/or account number, and for using a payment authorization channel, whereby a third party payment authorization network is avoided because the system obviates the need to validate the user's credit or debit card number, the system comprising:
   a memory device; and
   a processing device operatively coupled to the memory device, wherein the processing device is configured to execute computer-readable program code to:
      establish a communication channel between the system and a merchant or a merchant network in communication with the merchant;
      wherein the communication channel comprises a network communication channel including at least some financial institution network infrastructure but without passing through a third party payment authorization system configured to authorize transaction involving credit and/or debit card numbers;
      receive a token different than a credit card number, debit card number or account number associated with a user account associated with a customer of the financial institution, the token being associated with the user account associated with the customer of the financial institution;
      wherein the token is configured in a format enabling the token to be communicated over the financial institution network infrastructure;
      receive transaction data associated with a transaction between the customer of the financial institution and the merchant; and
      determine whether to authorize the transaction based on the received token and the received transaction data without communicating the token to a third party payment authorization system configured to authorize transaction involving credit and/or debit card numbers.

2. The financial institution system of claim 1, wherein the computer-readable program code is further configured to cause the processing device to:
   receive one or more preferences from the customer for managing one or more limits on the use of the token associated with the user account.

3. The financial institution system of claim 2, wherein the computer-readable program code is further configured to cause the processing device to:
   determine whether the received transaction data conforms to the one or more limits managed by the one or more preferences;
   if so, approve the transaction; and
   if not, decline the transaction.

4. The financial institution system of claim 1, wherein the computer-readable program code is further configured to cause the processing device to:
   based on the received transaction data and the received token, approve the transaction.

5. The financial institution system of claim 4, wherein the computer-readable program code is further configured to cause the processing device to:
   in response to approving the transaction, initiate communication of an approval communication to the merchant over the communication channel and configured to indicate to the merchant that the transaction was approved.

6. The financial institution system of claim 1, wherein the computer-readable program code is further configured to cause the processing device to:
   based on the received transaction data and the received token, decline the transaction.

7. The financial institution system of claim 6, wherein the computer-readable program code is further configured to cause the processing device to:
   in response to declining the transaction, initiate communication of a decline communication to the merchant over the communication channel and configured to indicate to the merchant that the transaction was declined.

8. The financial institution system of claim 1, wherein the computer-readable program code is further configured to cause the processing device to:
  create the token and associate the token with the user account;
  associate the token with one or more pre-approved merchants; and
  store pre-approved merchant data indicating the association between the token and the one or more pre-approved merchants.

9. The financial institution system of claim 8, wherein the computer-readable program code is further configured to cause the processing device to:
  determine whether the transaction data corresponds to one of the pre-approved merchants;
  if not, decline the transaction; and
  if so, determine whether to approve the transaction based at least in part on the transaction data and the token.

10. The financial institution system of claim 1, wherein the token is a single-use token.

11. The financial institution system of claim 1, wherein the token is a multi-use token.

12. The financial institution system of claim 1, wherein the token comprises an alpha-numeric code.

* * * * *